Aug. 4, 1953   F. J. LAMBERTY   2,647,352
RADIAL BACK-OFF PROCESS AND APPARATUS FOR GRINDERS
Filed June 7, 1948   6 Sheets-Sheet 1

Inventor:
Frank J. Lamberty
By Watson D Harbaugh
Atty

Aug. 4, 1953    F. J. LAMBERTY    2,647,352
RADIAL BACK-OFF PROCESS AND APPARATUS FOR GRINDERS
Filed June 7, 1948    6 Sheets-Sheet 2

Inventor:
Frank J. Lamberty.
By ⟨signature⟩
atty

Aug. 4, 1953     F. J. LAMBERTY     2,647,352
RADIAL BACK-OFF PROCESS AND APPARATUS FOR GRINDERS
Filed June 7, 1948     6 Sheets-Sheet 3

Inventor:
Frank J. Lamberty
By *[signature]*
atty

Aug. 4, 1953 F. J. LAMBERTY 2,647,352
RADIAL BACK-OFF PROCESS AND APPARATUS FOR GRINDERS
Filed June 7, 1948 6 Sheets-Sheet 5

Fig. 9.

Inventor:
Frank J. Lamberty
By
Atty

Patented Aug. 4, 1953

2,647,352

UNITED STATES PATENT OFFICE 2,647,352

RADIAL BACK-OFF PROCESS AND APPARATUS FOR GRINDERS

Frank J. Lamberty, Fox Lake, Ill.

Application June 7, 1948, Serial No. 31,463

15 Claims. (Cl. 51—225)

The present invention relates to the grinding, forming and sharpening of rotary form-cutting tools, and more particularly to the radial back-off or relief of the cutting lands upon various types of cutters having a plurality of cutting edges or lips having a radial dimension and including the sharpening of cutting edges which extend inwardly to the axis of rotation such as those of drills.

This application is a continuation-in-part of my application Serial No. 545,801, filed July 20, 1944, now abandoned.

Although the invention is useful in other relations as will be apparent from the description herein including sharpening drills and the relief grinding of taps, it is particularly useful in sharpening counterboring tools whose general function is to counterbore different diameters to different depths simultaneously in a workpiece according to the contour of the cutting edge to provide in the workpiece a counterbore defining a surface of revolution whose sectional contour is the contour of the line of the cutting edge. These tools are sometimes referred to as step cutters or contour tools and may be referred to hereafter as multiple step cutters or form-cutting tools. These tools may be provided with any one of a number of cutting edges, all preferably identical to cut the contour desired, and each cutting edge of any cutting edges which extend to the axis of the cut can be further relief ground without damage to the others.

In making these tools, bar stock is generally turned down on a lathe to a contour at its working end which mates with the contour to be produced by the tool in a workpiece and radially directed millers cutaway stock from the working end to leave cutting lands whose leading edges are later ground to form cutting edges on the working end of the tool. The open space left between the lands by the removal of the metal serves as flutes which afford clearance for the removal of chips. At its rear end the tool is provided with a shank for machine support and drive.

In order to avoid a frictional binding or riding between the workpiece and the land area trailing the cutting edge during cutting operations, the land is relieved on its peripheral face in an axial direction over the surface thereof trailing the cutting edge beginning at the cutting edge and defining a surface of revolution. This is of particular interest because in the conventional practice the relief begins at a certain point spaced from and in back of the cutting edge to leave immediately behind the cutting edge stock of sufficient width to allow for future sharpening. This unrelieved width of stock is always a narrow compromise, generally about one-sixteenth of an inch, between the expected sharpening life of the cutter and the permissible binding or frictional drag which occurs between the workpiece and the unrelieved portion of the land.

The maximum width permitted between the cutting edge and the radial relief for sharpening is rather critical because it cannot be too wide. To the extent that an unrelieved portion exists which trails the cutting edge, to that extent the unrelieved face of the land rides against the wall of the cut to develop friction and to oppose the feed effort imposed upon the tool.

In sharpening multiple step cutters in the old way not only does the relief or back-off on the cutting lands have to be retouched each time that the tool is sharpened, but as the cutting edge is shifted circumferentially deeper by sharpening into the stock of the land, the contour of the cutting edge has to be touched up in order for the tool to cut to the same shape as it did before. This requires a great deal of time and painstaking effort to renew the tool for further use and in order to save time a short cut is generally employed by hand-grinding the relief, an expedient which also limits the accuracy-life of the tool materially.

After repeated sharpenings have removed the stock left at the cutting edge for that purpose, further sharpening changes the diameter of the tool greatly, and the whole tool is either scrapped or turned down further and ground a little deeper to provide it with a different or a renewed contour.

One of the objects of the present invention is to provide an improved method and apparatus for accomplishing the method of relief grinding tools to eliminate any unrelieved portions behind the cutting edges, yet provide for a greater sharpening life of the tool limited only by the amount of stock remaining in the land which is necessary to support the cutting effort of the cutting edge.

Another object of the invention is to relieve the face of a land along a surface of revolution having a progressively deepening contour identical with that of the cutting edge starting at the cutting edge.

Moreover, many form-cutting tools have or are formed with cutting edges which bore out the workpiece along the axis of rotation of the tool to pilot the cut or provide an opening in the workpiece leading from the larger cavity left by the form tool. Heretofore the pilot cutting edges and the form-cutting edges of necessity have been relief ground upon separate machines. In the present invention all lands of a form-cutting tool can be relief ground in one machine so that, among other things, perfect concentricity for all cutting edges is attained.

The invention is further characterized by a simplified and direct method and means by which a tool having an irregular cutting edge can be quickly sharpened by merely dressing off the face of the cutting edge, yet the effective cutting contour of the tool, its accuracy and tolerances are correctly maintained without need for retouching.

A further characteristic of the invention is found in the fact that once a tool has been relief ground according to the teachings of the present invention, further relief grinding need not be repeated with subsequent sharpenings since the sharpening of the edge does not change the cutting diameter or tolerances of the tool.

Another object is to relief grind a rotary cutting edge spaced from the axis of rotation, and a rotary cutting edge terminating at the same axis of rotation of an end cutting-form tool in the same machine without removal of the tool from the grinder to provide relieved surfaces of revolution having different axes.

A further object of the invention is to provide an apparatus whose geometry of action and theory of operation is simple and readily understood for use by novice tool makers and mechanics to bring to smaller shops results that are even improved over more expensive and more expertly operated grinders.

A further object of the invention is to provide an apparatus which is readily adapted to grind any and all sizes of tools at any and all angles of relief, accurately and with a minimum amount of adjustment.

These being among the objects of the invention, other and further objects will be apparent to those skilled in the art from the claims appended hereto, the drawings, and the description relating to the drawings.

Spoken of concisely, the invention contemplates a method and improved means for rotating a multiple step rotary cutter bodily about a secondary axis inclined to and intersecting the normal axis of the cutter within the confines of the tool and grinding the cutting edge of the cutter at a location disposed at right angles to both axes at the point of intersection, with the center mass of the cutter, which is coincident with the normal axis of the tool but off-center with respect to the secondary axis, rotated about the secondary axis in a direction towards the grinding wheel.

The angle between the secondary axis of rotation and the normal axis of the cutter determines the degree of back-off or relief administered to the cutter and as other steps on the cutter are ground the cutter is advanced forwardly with respect to the grinding wheel and moved towards the secondary axis of rotation to shift the point of intersection between the axes inwardly of the tool to keep the location of grinding at right angles to the point of intersection of the normal and secondary axes.

In the preferred embodiment not only is the above mentioned method and apparatus provided to relief grind about a secondary axis an end cutting edge of a form tool which is spaced from the axis of rotation of the tool, but also an end cutting edge which is coplanar with the other edge and which cuts to the center of the axis of tool rotation, is ground about an axis spaced from and parallel to the axis about which the first edge is ground. The spacing is preferably in the relative direction of the grinding contact.

In practicing the invention, a support 10 having an enlarged head 11 thereon journals a shaft 12 which is manually oscillated rotatably by a handle 13 through an arc of approximately 90° as limited by suitable and adjustable stops 14 and 15, disposed at the back end of the head 11. The support can be the head of a grinder or of a lathe or constructed as a separate unit to be mounted on the slideways of a grinder in association with a grinding wheel.

Figure 1:
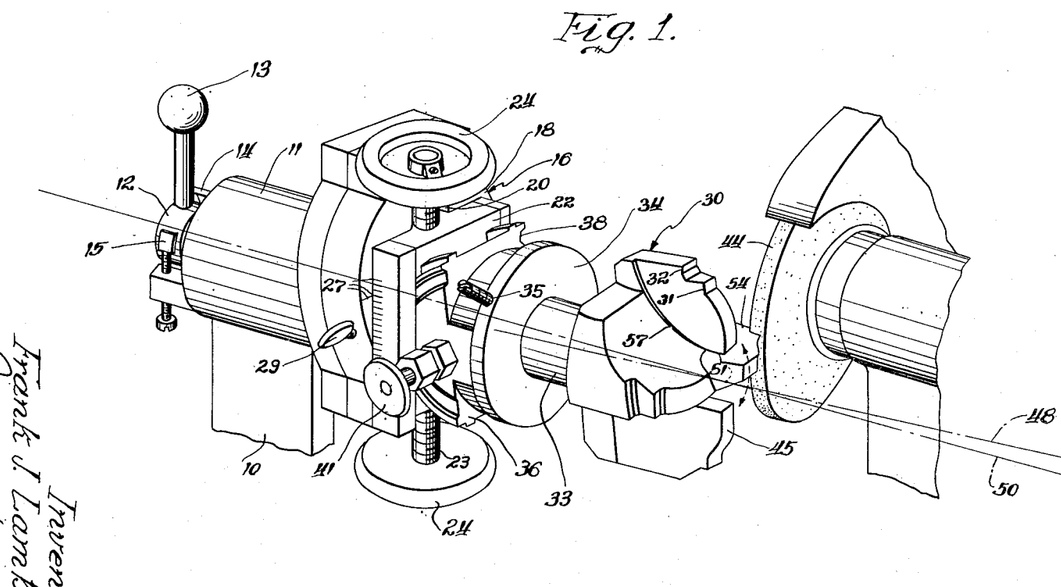
Fig. 1 is a perspective view of the essential elements of an attachment capable of performing the method of radial back-off grinding, a multiple step cutter as disclosed herein, in which view the parts are shown in full lines and the geometry in back of the theory of the grinding is represented in broken lines.
Figure 2:
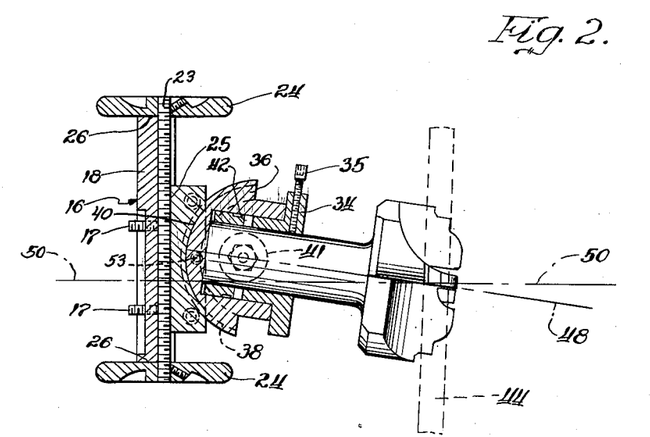
Fig. 2 is a sectional view of a part of the elements shown in Fig. 1 taken on a vertical plane through the axis of the grinder shown in Fig. 1.

A tool holder 16 is secured to the front end of the shaft as by bolts 17 (Fig. 2) and comprises a head member 18 machined to provide a dovetailed slideway 20 centered with respect to the axis of the shaft 12. The slideway receives therein the tongue 21 of a table member 22 diametrically adjusted by a threaded shaft 23 controlled by handwheels 24 as operated through a worm adjustment engaging in threaded relationship with a threaded portion upon the table as at 25. The shaft 23 is held against axial displacement by the inside faces of the adjustment wheels 24 engaging ends 26 of the head 18 and once adjustment is made a clamp screw 29 holds them rigidly in place. The distance that the table 22 is disposed off center of the axis of rotation of the supporting shaft 12 is usually determined by indicia 27, the pointer of which is preferably located upon the head 18 as shown at the level of the axis of rotation and the scale of which is located upon a clamping element 37.

A multiple step cutter 30 having stepped cutting edges indicated at 31 and 32 on land 45 is supported upon the table 22 by its shank 33 received in a collar 34 as held in place by a setscrew 35. The cutting edges 31 and 32 when put to work operate to cut in an axial direction and for that reason are hereinafter sometimes referred to as end cutting edges. The collar 34 serves as an adapter, being interchangeable with others like it and in turn is journaled in an adjustable member 36 as held in place by clamping elements 37 engaging in semicircular tracks 38 with a correspondingly mating contour as at 40.

Figure 3:
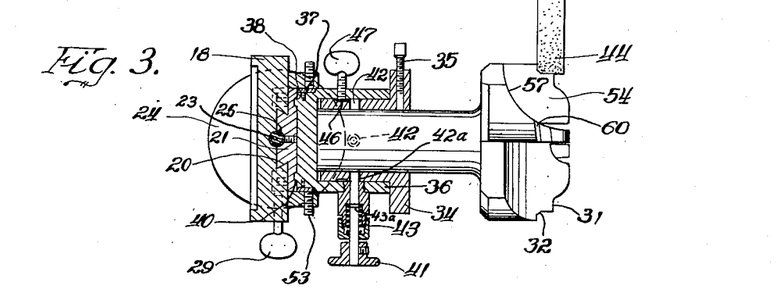
Fig. 3 is a sectional view taken upon a horizontal plane through the axis of the tool support and the grinding wheel.
Figures 5, 6:
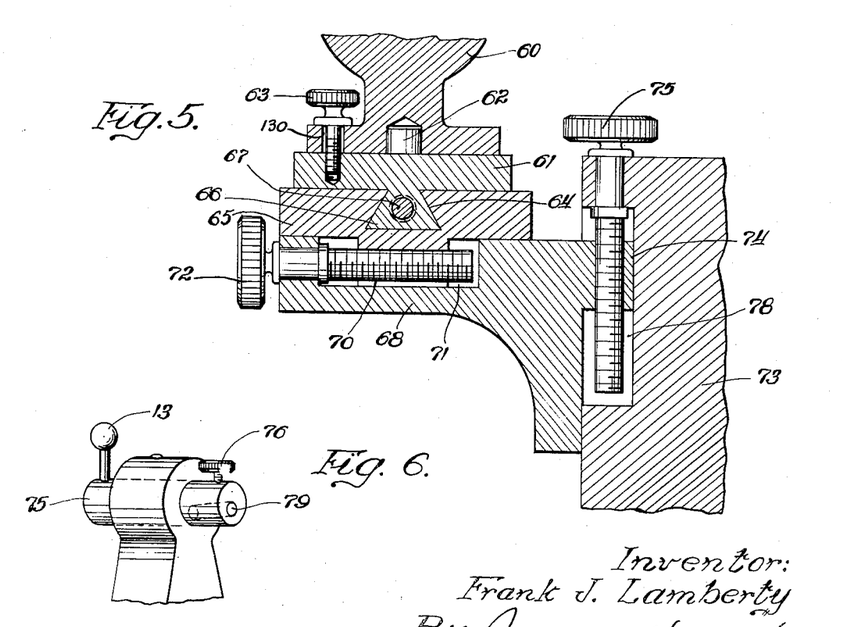
Fig. 5 is a sectional view illustrating the construction by which the motor and grinding wheel supported thereby are mounted for universal movement.
Fig. 6 is a perspective view of a simplified form of applicant's invention.

For purposes of locating the collar 34 at any point of relative rotation, a snap lock 41, more particularly shown in Fig. 3, is provided to engage in circumferentially spaced holes 42 in the collar 34 with a slight taper wedging action at 42a induced by a compression spring 43 bearing against a suitable cross pin 43a or the like. A suitable grinding wheel is shown at 44 as carried on the same bed which supports the head 10, the head 10 and grinding wheel 44 being adjustable with respect to each other in three directions and angularly with respect to each other by mounting a motor 60 which carries the grinding wheel 44 on a bed 61 for pivotal adjustment in a horizontal plane about a vertical pin 62. A clamp screw 63 passes through a slot 130 in the base of motor 60 and is threaded into the bed 61 to hold the motor in its adjusted position. The bed 61 in turn is mounted for horizontal rectilineal movement along a dovetailed slide 64 in a sub-bed 65 as adjusted to or fro by an adjusting screw 67 threaded for that purpose into the male dovetail member 66 on the bed 61. The sub-bed 65 in turn is mounted on a second sub-bed 68 by means of a similar dovetail arrangement for movement in a direction transverse to the rectilineal movement just described, a male dovetail being indicated at 70, a dovetail slide at 71, and an adjusting screw at 72. The second sub-bed 68 is mounted for vertical movement on an upright member 73 associated with the base 10. A male dovetail element 74 on the sub-bed 68 is received in a dovetail slide 78 as held in adjusted position by an adjusting screw 75.

In order to prevent the cutter 30 from being pulled accidentally forwardly into the grinding wheel 44 at any time, or when rotating the cutter 30 to place the various lands 45 thereof in grinding position for the grinding wheel 44, the collar 34 is circumferentially grooved as at 46 to receive the inner end of a threaded wing screw 47 which holds the parts against relative axial displacement.

The arcuate adjustment provided by the clamping element 37 and groove 38 permits bodily movement of the cutter 30 in a single plane to adjust the angle at which the axis of this cutter or the leading face of a cutting land is disposed with respect to the axis of the shaft 12.

The axis of the cutter 30 is indicated by broken line 48 being referred to as the normal axis of rotation of this cutter and the axis of the shaft 12 is indicated by the numeral 50 being sometimes referred to as the secondary axis. The point of intersection of the two axes is indicated at 51 and the center of the mass of the cutter 30 which is usually coincident with the normal mass of rotation is disposed off-center with respect to the secondary axis 50, which relationship is sometimes herein referred to as an off-center mass.

The grinding wheel 44 is adjusted to contact the land 45 of the cutter 30 at a location disposed at right angles to the axis 50 of shaft rotation where the shaft axis is intersected by the axis 48 of the cutter as at 51. This point of intersection is changed longitudinally of the axis 50 of the shaft 12 by operation of the worm adjustment wheels 24, in relation to the indicia 27, once the angle at which the two axes 48 and 50 intersect is determined by the adjustment between the groove 38 and clamping element 37. Lock screws 53 are employed to release the elements 37 for angular adjustment and to hold them rigidly in their adjusted position.

Figure 4:
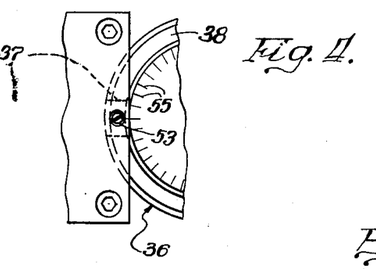
Fig. 4 is an enlarged plan view indicating a micrometer adjustment provided for determining the angle of the radial back-off accomplished.

In operation the relief angle is first set as determined by the angle between the axes 48 and 50. This is provided for in the adjustment involved by loosening the lock screws 53 and moving the member 36 to the angle desired as determined by indicia 55 as shown in Fig. 4. Once the angle between the axes 48 and 50 is determined, which angle may vary from two or three degrees to as much as fifteen degrees or more, the table 22 is moved upwardly or downwardly as the case may be, to bring the point of intersection 51 between the two axes at a level where the grinding wheel 44 is located to contact the work at a place normal to a plane including the axis 50 and axis 48 at the point of intersection 51.

The cutter 30 is slipped into place with its shank 33 held in place by the set screw 35. As shown in Fig. 1, a cutting edge face 54 on the land 45 next to the grinder is disposed preferably horizontally in a radial direction and axially at least at the same incline to the grinding wheel 44 as the incline between the normal and secondary axes 48 and 50 respectively. That portion of the cutting edge to be backed off contacts the grinding wheel 44 on a line interconnecting the center of this grinding wheel and the point of intersection 51 of the axes 48 and 50. Thereafter the snap latch 41 can be disengaged and the collar 34 rotated the same number of degrees which exists between the cutting edges of adjacent lands 45, to locate successively each and every cutting edge and leading face thereof in the same position with respect to the grinding wheel 44.

The grinding wheel 44 is brought into engagement with the cutter 30, and being formed to grind the contour desired, the cutter 30 is rocked back and forth through an arc of approximately 90° by the handle 13 as determined by the stops 14 and 15 to pass the cutting edge and the trailing portion of the land 45 back and forth in engagement with the grinding wheel 44. As each cut is taken, the grinding wheel 44 is advanced until the exact contour is provided at the cutting edge and the exact cutting diameter is reached. Thereafter the collar 34 having the shank of the cutter 30 locked therein is rotated to a new position as mentioned by releasing the snap latch 41 to bring the next cutting edge of the cutter 30 into position ready for engagement with the grinding wheel 44. The process of gradually advancing the grinding wheel 44 until the correct contour and cutting diameter is reached is repeated. Each and every one of all the cutting edges are treated alike to provide identical contours on the corresponding portions ground.

After corresponding portions of the cutting edges are ground to contour and size, the grinding wheel 44 is shifted towards the table 22 until the next portions of the cutting edges to be ground are reached. In making this move the relationship between the grinding wheel 44 and the point of intersection 51 is changed, and in order to bring the point of intersection 51 to a point directly opposite the grinding wheel 44 again the table 22 is raised for right-hand cutters, or lowered for left-hand cutters as by manipulating the lock screw 29 and worm handwheels 24. Thereafter the process just described for the first corresponding portions of the cutting edges is repeated for the second portions and by like adjustments for all subsequent portions, until the contour and diameter of all cutting edges are ground.

The action of the grinding wheel 44 with respect to the cutting edge and the grinding of the land 45 in back of the cutting edge is such that the back-off is started at the cutting edge of the land 45 opposite the point where the two axes 48 and 50 intersect and with a cutting edge face 54 of the land 45 disposed approximately at a right angle to a plane which includes the two axes 48 and 50. Then by rotating a right-hand cutting edge upwardly to bring the land 45 trailing the cutting edge into deeper and deeper contact with the grinding wheel 44 as when the handle 13 is pulled forwardly towards the stop 15, the relative direction taken by the grinding wheel 44 upon the land 45 is into the stock of the cutter 30 in an axial direction at an angle 60 shown in Fig. 3 without changing the diameter of the cut with respect to the normal axis 50 of the cutter. Thus the land 45 is cut away or backed off to provide the relief of the angle 60 determined by the included angle between the axes 48 and 50, and this angle of relief is constant for all contours of the cutting edge without variation in the radial dimension of the surfaces trailing the cutting edge. Therefore, when the cutter 30 is again and again resharpened, all that has to be done is to mount the cutter 30 in a grinder which will reface the cutting edge upon the face of the land indicated at 56, along an arcuate curve 57 which was made when the flutes were originally milled into the cutter 30, each face 56 being resharpened to the same circumferential depth in a manner which can easily be handled by shop mechanics. When the cutter 30 is thus sharpened, the shape of the cutting edges is unchanged since they have merely moved along the back-off and it is only necessary when the cutter 30 is put back into operation to advance the cutter towards the workpiece to take up for the axisl displacement that has occurred by grinding back on the land 45 along the axial back-off.

This method of axial back-off grinding of a radial cutting edge takes care of all contours on the cutter 30 because if the side wall contour of the cut to be made is cylindrical the end cutting edge is radially relief ground in accordance with the invention and the outer face of the land 45 merely follows the contour of the hole provided by the end cutting edge for that contour. Otherwise, any radial cutting edge, i. e., one which is inclined or disposed at right angles to the normal axis of rotation of the cutter, is axially backed off automatically to free the face of the land in back of the cutting edge from contact with the wall left upon the workpiece by the cutting edge. This back-off or relief begins at the cutting edge and follows a surface of revolution defined by the cutting edge contour.

The basic construction by which the method is performed and the preferred basic arrangement of the elements including adjustability and universality have been shown and described. Other forms of apparatus may be used for supporting the cutter 30 without departing from the teachings of the process disclosed, including supporting the cutter 30 by hand as long as the operator is careful to see that the cutter 30 is supported for rotation about a secondary axis 50 of rotation into engagement with a grinding wheel 44 with the normal axis 48 of the cutter 30 intersecting the secondary axis 50 of rotation at a point 51 directly opposite the line of grinding contact and the cutter 30 is rotated from this position with the normal axis 48 of the cutter 30 being moved towards the grinder during said rotation. Spoken of in another way, the shank 33 or the off-center mass of the cutter 30 is moved in a direction towards the grinder during said rotation.

Figure 7:
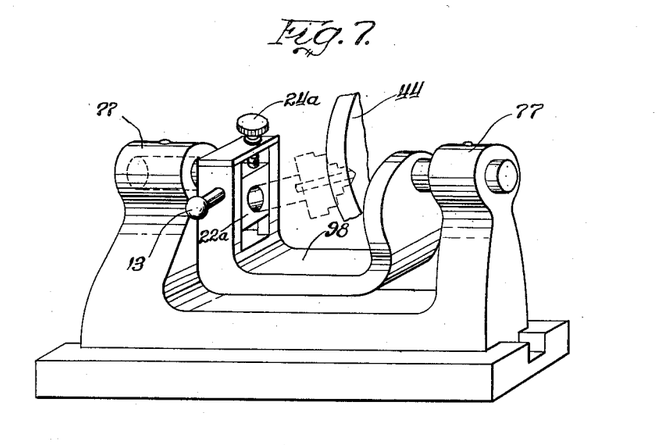
Fig. 7 is a perspective view of another embodiment of applicant's invention in which two journals are employed.

For instance, a shaft can be journaled and have an end hole 79 for receiving the shank of the cutter drilled therein off center and at an angle to the axis of rotation of a shaft 75 as shown in Fig. 6 where the shank of a tool can be mounted and clamped in place by a setscrew 76. Or the cutter 30 can be located between two bearings 77 in a yoke 98 as shown in Fig. 7 for rotation about an axis disposed at an angle to the work axis of the cutter 30 as defined, so long as the point of grinding on the cutting edge of the cutter 30 is disposed at right angles to the point at which the axes intersect. Drills can be also sharpened as mounted in the opening 79 provided the support is opened to receive drills of any length or size.

In Fig. 7, elements similar to those already described are identified with like numerals and the suffix "a."

Figure 8:
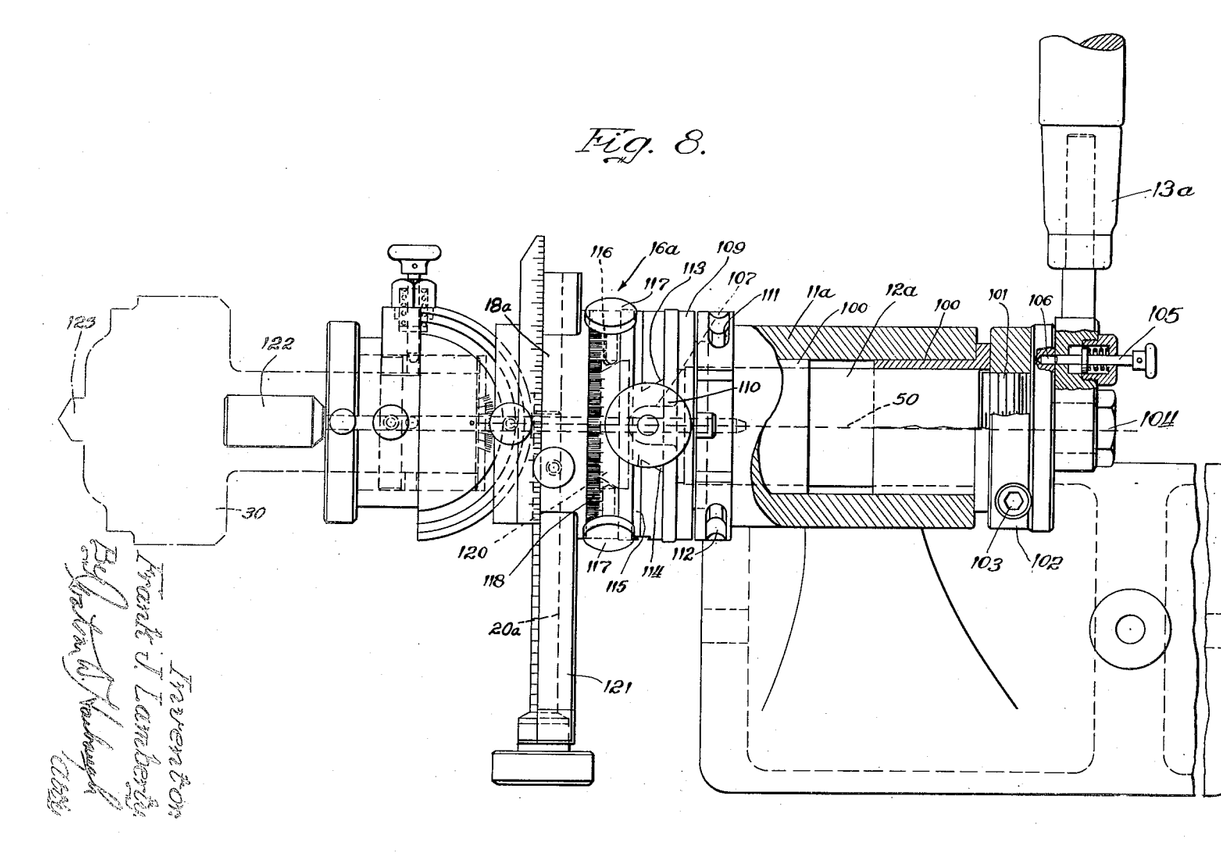
Fig. 8 is a side elevation, partly in section, of another and preferred embodiment of the invention.
Figure 9:
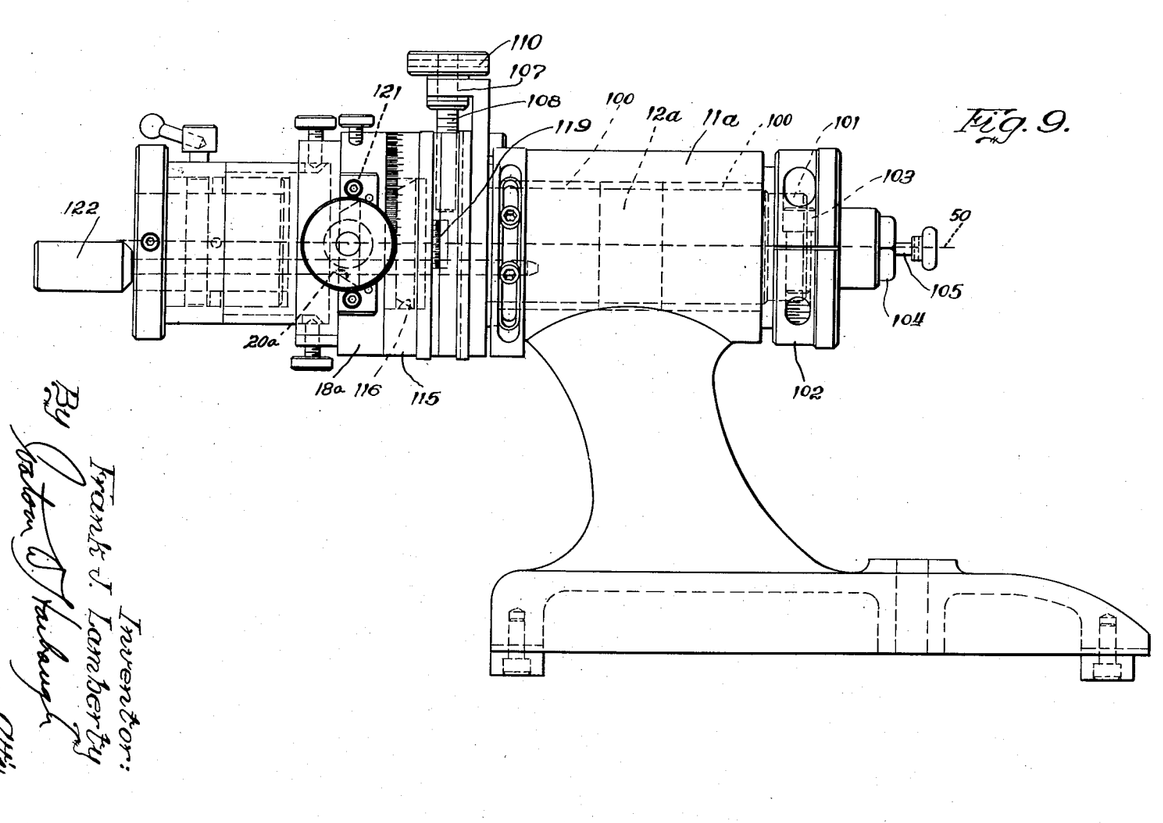
Fig. 9 is a plan view of the embodiment shown in Fig. 8.
Figure 10:
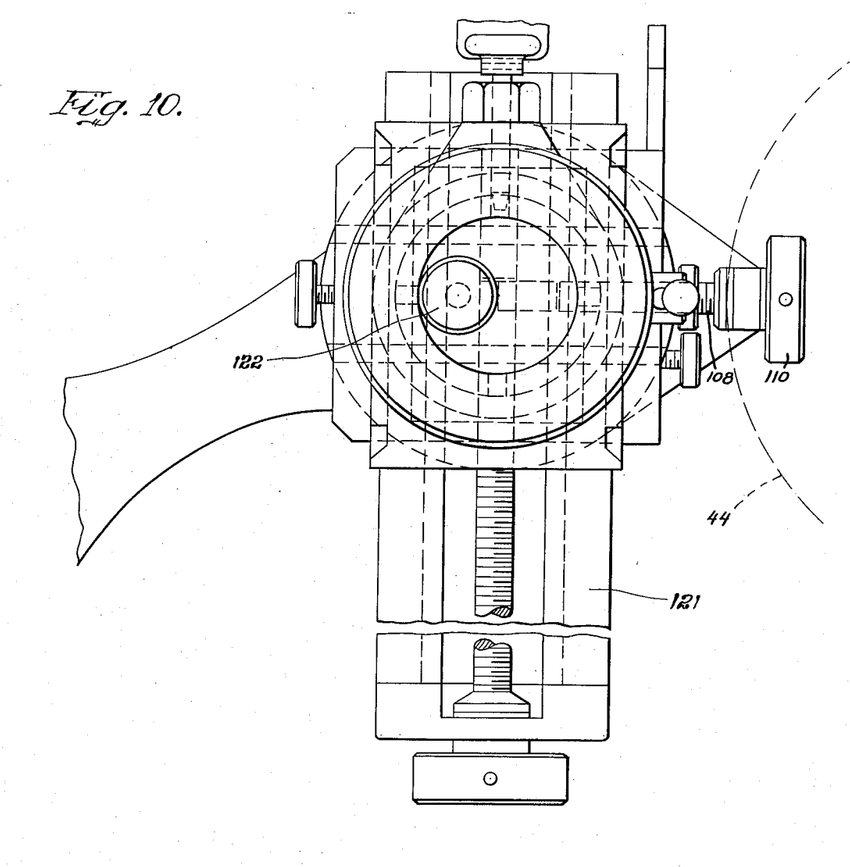
Fig. 10 is an end view of the embodiment shown in Figs. 8 and 9.

Referring now to Figs. 8, 9 and 10, like numbers also refer to like parts or parts having like functions with the suffix "a" added, the tool holder 16a has a shaft 12a journaled in bushings 100 mounted in the head 11a. The head 11a in this embodiment is shown as part of an embodiment which can be mounted upon a vertical bed as well as one a horizontal bed (not shown). At its tail end the shaft 12a is threaded as at 101 to receive a cap 102 provided with a split rim and having a tangential bolt 103 interengaging the two split edges to clamp the rim against the shaft 12a to hold the cap 102 against loosening.

The shaft 12a is hollow at its tail end and the cap 102 is centrally threaded to receive a stud bolt 104 upon the shank of which is journaled the handle 13a. The body of the handle has a snap latch 105 thereon operative to engage in any one of a number of holes 106 provided in the face of the cap 102 whereby the handle 13a can be located in any one of a number of positions with respect to the cap 102 and in turn with the shaft 12a. The holes 106 are preferably spaced 30° apart so that quadrant and sextant choices and multiples or divisions thereof are available with standard tools.

At its front end the shaft 12a has preferably formed integrally therewith a circular head 109 provided with an overhanging axially extending ear 107 thereon apertured to receive an adjusting screw 108 having a knurled head 110. In back of the head 109 slots 111 are provided in the stationary head 11a through which stop bolts 112 are threaded into the shaft 12a to limit and provide for a rocking movement under the control of the handle 13a ranging from 60° to 90° depending upon the spacing of the bolts 112.

In Fig. 10 the grinding wheel 44 is shown located at the far side of the construction as in Fig. 9 and at the near side of the construction shown in Fig. 8, and the front face of the head 109 is dovetail slotted as at 113 in alignment with the ear 107 to receive a dovetail tongue 114 slidably therein which is integral with an intermediate member 115.

The tongue 114 is apertured and threaded longitudinally thereof to receive the threaded portion of the screw 108 so that adjustment of the screw 108 will displace the intermediate member 115 in a direction towards the grinding wheel 44 whenever desired, which displacement is indicated on the scale 119 (Fig. 9).

The front face of the intermediate member 115 is recessed as at 116 (Fig. 9) and radially apertured through the wall of the recess to receive setscrews 117 whose tapered ends extend into the recess 116. The forward marginal edge of member 115 is calibrated with a 360° scale 118 and the front face of the intermediate member 115 is ground flat and square with the axis 50 of the shaft 12a.

The head member 18a has a boss 120 thereon received in the recess 116 and is grooved with an inward taper as at 121 (Fig. 9) to be held in clamped relationship by the setscrews 117. The head member 18a has an extra long slide element having the slideway 20a in it for a wider range of adjustment, but otherwise the head member 18a and parts supported thereon are substantially identical with parts already described.

A removable alignment pin 122 is provided in order to adjust all the parts in perfect axial alignment when desired. This pin slips through apertures in all the supported parts and into an alignment opening in the end of the shaft 12a at a point off center the axis 50 of this shaft so that not only is axial alignment accomplished but rotary alignment also, when the pin 122 is used.

*Operation.*—As shown in Fig. 8 the tool 30 is shown in dotted lines as having a center cutter 123 in its front end. The cutting edges of this cutter are inclined to the axis in a manner similar to those of a twist drill. After the other cutting edges 31, 32 are sharpened with any one of the embodiments shown as heretofore described in connection with the embodiment disclosed in Fig. 1, the knurled head 110 in Fig. 8 is turned to displace the tool 30 towards the grinding wheel 44 and the grinding face of this wheel is brought into edge contact with one of the cutting edges of the center cutter 123 in a manner similar to the initial positions with respect to the cutting edges 31, 32 and the grinding wheel 44, after which the handle 13a is swung to carry the grinder over the land 45 trailing the cutting edge of the center cutter 123 to back-off or relief grind it about the secondary axis 50 which, in the new setting, no longer intersects the tool axis 48 but is spaced therefrom away from the grinding wheel 44, i. e., the tool axis is now closer to this grinding wheel than the secondary axis 50. As rocked by the handle 13a, the relief is ground but furthermore the tool rocks away from the grinding wheel 44 whereby the grinding wheel clears the leading edge of the next adjacent land 45 which otherwise rises towards the grinding wheel 44 during the rocking motion and might otherwise be damaged.

Having thus described the invention, its operation, and the various principles and geometric relationships provided for accomplishing the grinding of the multiple step cutter as representative of a range of tools, it will be apparent to those skilled in the art how the objects are accomplished and that various and further modifications can be made in the apparatus and means for accomplishing the process without departing from the spirit of the invention, the scope of which is commensurate to the appended claims.

What is claimed is:

1. The method of relieving that portion of a land trailing the cutting edge of a multiple edge form cutter supported by a shank including mounting the cutter for rotation about a secondary axis which intersects at an acute angle the axis of normal rotation of the cutter in a plane common to both axes and normal to the plane of the cutting edge, moving the cutter and a grinding wheel with respect to each other in a direction normal to the plane which includes both axes until grinding contact is established with one of the lands at its cutting edge at a point on a line disposed approximately normal to the secondary axis at said point of intersection, and rocking said cutter about said secondary axis to move the grinding wheel back and forth across the exposed outer edge of the land trailing the cutting edge on the shank side of said intersection by rotating the cutter in a direction carrying the shank towards the grinding wheel.

2. The method of backing off the cutting land of a cutter to a predetermined angle of relief, said cutter having a cutting edge of increasing radial dimension including bodily rotating the cutter about a secondary axis that is sharply inclined at a predetermined angle with respect to the axis of normal rotation of the cutter in a direction moving the center of the mass of the cutter towards a grinding wheel from a position in which the grinding wheel is in contact with said cutting edge at a point on a line disposed perpendicular to both of said axes, the angle of inclination and the angle of relief ground being approximately equal.

3. The method of backing off the cutting edges of a multiple step rotary cutter including rotating the cutter about a secondary axis disposed at an acute angle to the axis of normal rotation of the cutter from a position in which a cutting edge is in contact with a grinding wheel at a point on a line disposed at right angles to both axes at their point of intersection and in a direction moving the center of the mass of the cutter towards the grinding wheel about said secondary axis, to carry the grinding wheel deeper into the land in an axial direction as the grinding wheel moves away from the cutting edge, and repeating said operation upon axially spaced cutting edges after shifting said axes with respect to each other to keep the point of grinding on a line normal to both axes.

4. The process of grinding the cutting edge of a form cutting tool comprising contacting a land of the tool at its leading edge and rotating the tool with respect to the grinding wheel to relief grind it about an axis inclined to the cutter's normal axis of rotation at a fixed point upon the secondary axis disposed within the confines of the tool, said rotation of the tool being in a direction which carries the shank of the tool toward the grinder during rotation about said secondary axis, the contact between the grinding wheel and tool being located on the shank side of the tool from said fixed point, and sharpening the cutting edge by grinding away the leading face side of the land.

5. An apparatus for back-off grinding a rotary cutter having a land with a cutting edge thereon rotatable about the normal axis of the cutter, including means for supporting the cutter for rotation about a secondary axis which is constantly in the same plane with and intersecting at an acute angle said normal axis, a grinding wheel, means for locating the grinding wheel with respect to the cutter to contact an end cutting edge of the cutter at a point along a line disposed at right angles to both axes at the point of their intersection, means secured to the supporting means for moving the cutter about the secondary axis in engagement with said wheel, and means for shifting the cutter towards the grinding wheel to separate said axes in a direction normal to both of them.

6. An apparatus for back-off grinding an end cutting edge of a cutter including a standard, a shaft journaled in the standard, a table, means carried by the shaft and supporting the table for shifting the table on the shaft in a line perpendicular to the axis of rotation of the shaft, a second table, means carried by the first table and supporting the second table for shifting the second table in a line perpendicular to both the first line and said axis, a holder for receiving the shank of a cutter, means for mounting the holder upon the second table to dispose the axis of the cutter in the plane common to the line of movement of the second table and the axis of the shaft and at an acute angle with respect to the axis of the shaft at a point spaced from the second table, and means for supporting a grinding wheel in position to engage the end cutting edge at a point on a line normal to both axes.

7. An attachment comprising a shaft supported for rocking movement about a predetermined axis, a table element secured to the shaft and movable therewith, a carried member supported on the table, means for bodily moving said carried member in a direction transversely to said axis, and a holder having an opening therein mounted on the carried member for angular adjusted movement to position the axis of the opening at an angle to and intersecting said predetermined axis, said holder being constructed to receive a rotary cutter in said opening in any one of a number of predetermined positions, said holder and bodily moving means being so constructed and arranged that movement of the carried member by the bodily moving means shifts the point of intersection between the two axes.

8. The method of relieving that portion of a land trailing the cutting edge of a multiple edge form cutter supported by a shank including mounting the cutter for rotation about a secondary axis which intersects at an acute angle the axis of normal rotation of the cutter, moving the cutter and a grinding wheel with respect to each other in a plane perpendicular to a plane which includes both axes until grinding contact is established with one of the lands at its cutting edge, and rocking said cutter about said secondary axis to move said cutter relative to the grinding wheel across the exposed outer edge of the land trailing the cutting edge on the shank side of said intersection by rotating the cutter in a direction carrying the shank towards the grinding wheel.

9. The method of backing off the cutting edges of a multiple step rotary cutter including rotating the cutter about a secondary axis disposed at an acute angle to the axis of normal rotation of the cutter from a position in which a cutting edge is in contact with a grinding wheel at a point on a line disposed at right angles to both axes at their point of intersection and in a direction moving the center of the mass of the cutter towards the grinding wheel about said secondary axis, to carry the grinding wheel deeper into the land in an axial direction as the grinding wheel moves away from the cutting edge.

10. The process of relief grinding the cutting edge of a form cutting tool comprising contacting a land of the tool at its leading edge and rotating the tool with respect to the grinding wheel about an axis inclined to the cutter's normal axis of rotation and about a fixed point disposed within the confines of the tool in a direction which carries the shank of the cutter toward the grinder during rotation about said secondary axis to evolve a predetermined cutting contour on the edge of the land, contact between the grinding wheel and cutter being located on the shank side of the cutter from said fixed point, and dressing off the leading face of the land to a predetermined circumferential depth along a plane substantially parallel with said plane of the cutting edge to shift the cutting edge circumferentially along the relieved portion of the land.

11. An apparatus for back-off grinding a rotary cutter having a land with an end cutting edge thereon rotatable about the normal axis of the cutter, including means for supporting the cutter for rotation about a secondary axis which is constantly in the same plane and intersecting at an acute angle said normal axis, a grinding wheel, means for locating the grinding wheel with respect to the cutter to contact an end cutting edge of the cutter at a point along a line disposed at right angles to both axes at the point of their intersection and means secured to the supporting means for moving the cutter about the secondary axis in engagement with said wheel.

12. An apparatus for back-off grinding an end cutting edge of a cutter including a standard, a shaft journaled in the standard and supported against axial movement, a table, means carried by the shaft and supporting the table for moving the table in a line perpendicular to the axis of rotation of the shaft, a holder for receiving the shank of a cutter, means for mounting the holder upon the table to dispose the axis of the cutter in the plane common to the line of movement of the table and the axis of the shaft and at an acute angle with respect to the axis of the shaft to intersect at a point spaced from the table, and means for supporting a grinding wheel in position to engage the end cutting edge at a point on a line normal to both axes at the point of their intersection.

13. An attachment for back-off grinding an end cutting edge comprising a shaft supported for rocking movement about a predetermined axis, a table element secured to the shaft and movable therewith in a fixed plane normal to said axis, a carried member supported on the table and movable in a direction transversely to said axis, and a holder having an opening therein mounted on the carried member for angular adjusted movement to position the axis of the opening at an angle to and intersecting said predetermined axis, said holder being constructed to receive an end cutting rotary cutter in said opening in any one of a number of predetermined positions.

14. An apparatus for back-off grinding a rotary cutter having a land with a radially extending cutting edge thereon rotatable about a normal cutting axis of the cutter including support means rotatable about a predetermined axis in relationship to a grinder, a support, means for mounting the support on said support means for relative movement in a direction transverse to said predetermined axis, and a holder for said cutter carried by said support means for moving the holder on said support in a direction transverse to said predetermined axis and to the first transverse direction of movement, said holder including an adjusting means movable to dispose said cutting axis at an acute angle to said predetermined axis within the confines of said cutting edge and land, said support when moved displacing said cutting axis in the direction of said grinder.

15. An apparatus for back-off grinding a rotary cutter having a land with a radially extending cutting edge thereon rotatable about a normal cutting axis of the cutter including support means rotatable about a predetermined axis in relationship to a grinder, means for limiting relative rotation to a minor portion of a revolution, a support, means for mounting the support on said support means for relative movement in a direction transverse to said predetermined axis, and a holder for said cutter carried by said support, means for moving the holder on said support in a direction transverse to said predetermined axis and to the first transverse direction of movement, said holder including an adjusting means movable to dispose said cutting axis at an acute angle to said predetermined axis within the confines of said cutting edge and land and the cutting edge in contact with the grinder near one limit of said minor portion of a revolution, said support when moved displacing said cutting axis in the direction of said grinder.

FRANK J. LAMBERTY.

References Cited in the file of this patent

UNITED STATES PATENTS

| Number | Name | Date |
| --- | --- | --- |
| 270,365 | Bancroft et al. | Jan. 9, 1883 |
| 331,115 | Chase | Nov. 24, 1885 |
| 614,247 | Goodhew et al. | Nov. 15, 1898 |
| 819,173 | Schmaltz | May 1, 1906 |
| 1,679,413 | Einstein et al. | Aug. 7, 1928 |
| 1,862,809 | Strong | June 14, 1932 |
| 2,413,436 | Dawson | Dec. 31, 1946 |

FOREIGN PATENTS

| Number | Country | Date |
| --- | --- | --- |
| 215,278 | Germany | Oct. 23, 1909 |